R. E. STURMAN.
TIRE.
APPLICATION FILED JUNE 15, 1914.
1,143,461.
Patented June 15, 1915.
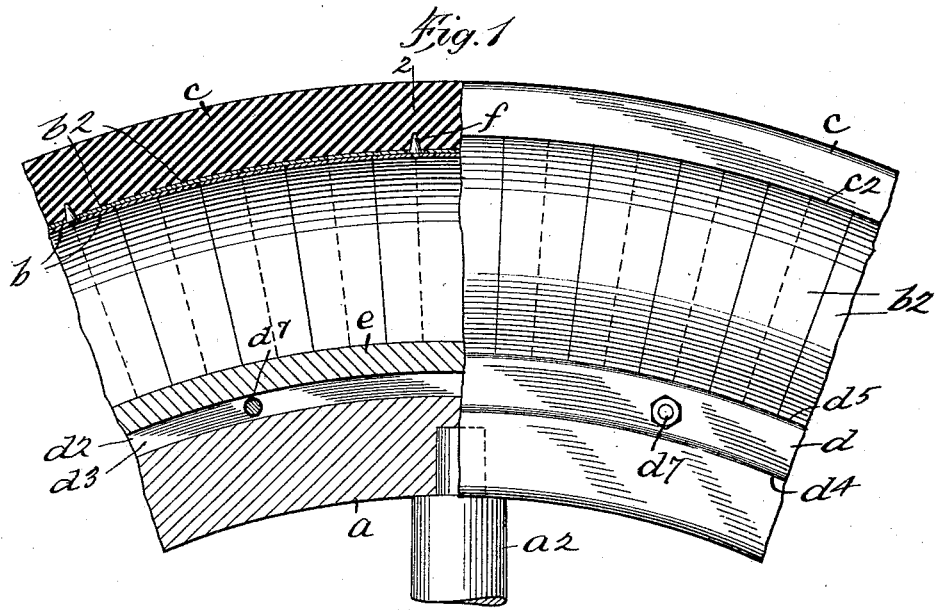
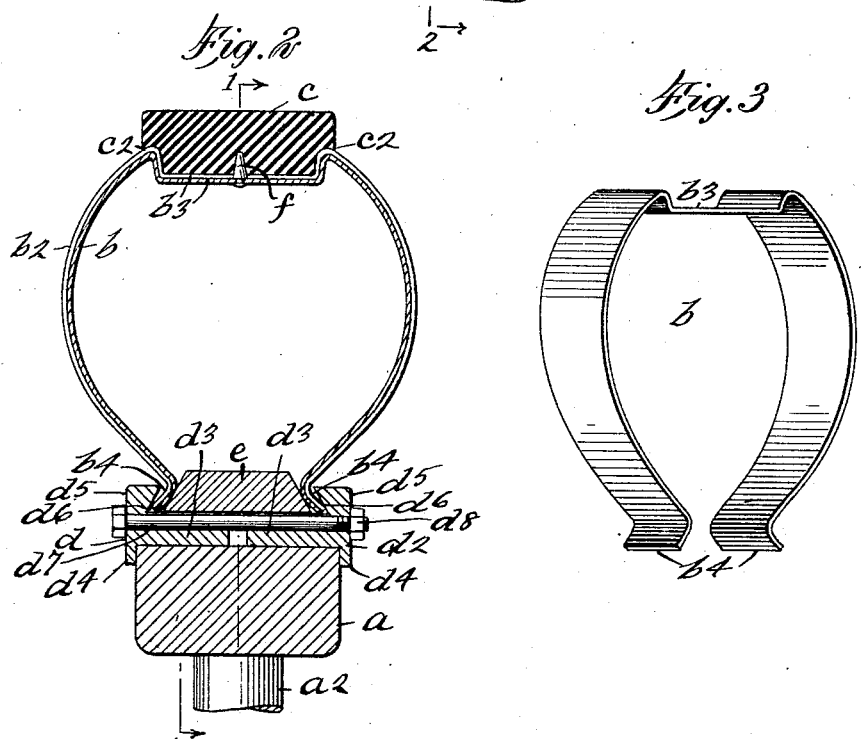
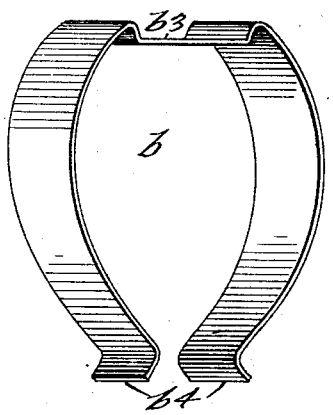
WITNESSES
F. D. Sweet
J. C. Larsen
INVENTOR
Robert E. Sturman
BY
ATTORNEYS

UNITED STATES PATENT OFFICE.

ROBERT E. STURMAN, OF FRANKLIN TOWNSHIP, WRIGHT COUNTY, MINNESOTA.

TIRE.

1,143,461. Specification of Letters Patent. Patented June 15, 1915.

Application filed June 15, 1914. Serial No. 845,239.

*To all whom it may concern:*

Be it known that I, ROBERT E. STURMAN, a citizen of the United States, and resident of Franklin township, in the county of Wright and State of Minnesota, have invented certain new and useful Improvements in Tires, of which the following is a specification.

My invention relates to vehicle tires, and is an improvement over the form shown and described in Letters Patent No. 1,094,034, issued to me April 21, 1914, and the main object of the present invention is to simplify the structure and assembling of the tire over the form shown in the said patent.

In the patented form the tire sections are superimposed and overlapping, but the tread holding plates are separate and riveted to the inner plates, whereas in the present form I recess the outer surfaces of all the sections whereby a tread holding channel is formed in the sections themselves; further, in the old form I provide a continuous rim 5, having a dovetailed groove therein for the reception of the tire sections, wedges being employed to hold the ends of the sections apart, but in the present form I make the rim of two similar parts, one on each side of the wheel felly, and bolted together, the section ends being held between said rim members and a wedge-shaped ring of a greater diameter between said members, and I also provide means for preventing the "creeping" of the tread upon the tire sections.

My invention is fully described in the following specification, of which the accompanying drawings form a part, in which the separate parts are designated by the same reference characters in each of the views, and in which:—

Figure 1 is a fragmentary, side, elevation of a tire constructed in accordance with my present invention, partly in section on the line 1—1 of Fig. 2; Fig. 2 is a section taken on the line 2—2 of Fig. 1; and Fig. 3 is a perspective view of one of the tire sections, removed from the tire.

In the drawings forming a part of this application I have shown a portion of a vehicle wheel comprising the usual or any desired felly $a$, and spokes $a^2$, my tire being mounted upon said felly and locked thereto, the present tire sections $b$ and $b^2$ being superimposed and overlapped in the same manner as in the patent referred to, but said sections are each recessed, as shown at $b^3$, to collectively form peripheral channels, the channel formed in the sections $b$ for receiving the sections $b^2$ and the channel formed in the sections $b^2$ receiving the rubber tread $c$, and which, as clearly shown at $c^2$, extends slightly beyond the sides of the channel in which it is held, thus distributing the load on said members within the channel and on each side thereof, but the inner ends of the tire sections $b$ and $b^2$ are similar to those shown in my patent, out-turned as shown at $b^4$.

The rim consists of two similar members $d$ and $d^2$, one on each side of the felly $a$, and having, each, an inwardly directed portion $d^3$ resting on the outer face of the felly, and a flange $d^4$ adapted to be brought to bear upon the corresponding side of the felly, and an outwardly directed flange $d^5$ beyond the portion $d^3$, and the inner side of which is inwardly flared whereby a dove-tailed groove $d^6$ is formed between the two rim sections for the reception of the ends $b^4$ of the tire sections $b$ and $b^2$, and a plurality of bolts $d^7$, having nuts $d^8$ thereon, hold the rim members $d$ and $d^2$ firmly against the felly sides. I also provide a ring $e$, wedge-shaped in cross section and of less transverse width than the distance between the rim flanges $d^5$, and of an internal diameter approximating that of the circle formed by the outer surfaces of the bolts $d^7$, whereby said ring will rest upon said bolts, or approximately so, and the ends of the tire sections rest between the ring $e$ and the corresponding rim flanges $d^5$, as clearly shown in Fig. 2, and I also provide a spike $f$ in a number of the inner tire sections $b$, suitably spaced in the tread groove, to prevent the tendency of said tread to "creep" around the tire.

It will be seen, from the foregoing and by reference to Fig. 2, that assembling of my present tire is much more easily accomplished than was possible with the patented form referred to, as one of the rim members may be left off until all the tire sections, and the ring $e$, are in place, said rim member being afterward installed and the nuts on the bolts assembled and tightened, and the tire is complete.

My tire possesses all the advantages of a pneumatic tire with none of the disadvantages thereof, as no punctures nor blow-outs are possible; they are practically as economical in original cost, and have no maintenance cost, other than oiling to prevent rust and also to lubricate the sections as they ride upon each other, and when the tread is worn out a new one may be readily substituted therefor, not requiring, as with pneumatic tires, an entire new shoe, and, if desired, I may provide a thin rubber or other outer covering for the metal tire sections, whereby the appearance of the present pneumatic tire is exactly imitated.

My invention is very simple, thoroughly efficient as demonstrated by test, of a continuous resiliency determined by the load to be placed thereon, not requiring the care in inflation required by pneumatic tires in the degree of atmospheric temperature, and comparatively inexpensive and, with a reservation to myself of all such changes in and modifications of the details shown and described as properly come within the scope of the following claim.

What I claim as new, and desire to secure by Letters Patent, is:—

The combination with a vehicle wheel, of a tire comprising an inner series of transversely arranged, yoke-shaped, resilient sections, an outer series of similar sections, the joints of each series being staggered with respect to the joints of the other series, the sections of each series being recessed in the outer surfaces thereof and the recessed portions of the outer sections being nested in the recesses of the inner sections, a tread in the peripheral groove formed by the recesses of said outer sections, and means for maintaining said sections in relative positions, comprising a pointed projection on each of a plurality of inner sections outwardly directed between the corresponding outer sections, and projecting into said tread.

In testimony that I claim the foregoing as my invention I have signed my name in presence of the subscribing witnesses.

ROBERT E. STURMAN.

Witnesses:
　FRED A. KNOLL,
　WM. STURMAN.